3,538,014
METHOD PRECIPITATING ACTIVATED CALCIUM PHOSPHATE HALIDE PHOSPHOR

Anselm Wachtel, Parlin, N.J., assignor to Westinghouse Electric Corporation, Pittsburgh, Pa., a corporation of Pennsylvania
No Drawing. Filed Sept. 1, 1967, Ser. No. 664,938
Int. Cl. C09k 1/36
U.S. Cl. 252—301.4          12 Claims

ABSTRACT OF THE DISCLOSURE

A method for producing activated calcium phosphate-halide phosphor wherein the phosphor is precipitated directly from solution. The requisite phosphor constituents may be in separate solutions with an excess of phosphate over and above that required. When the solutions are mixed, the phosphor is precipitated therefrom. Alternatively, all constituents may be in one solution and precipitation effected by the addition of a precipitating agent.

BACKGROUND OF THE INVENTION

This invention relates to a method of producing activated calcium phosphate-halide phosphor. Luminescent materials are generally either found in the natural state or produced by an activation process which consists of firing the raw mix to cause a solid state incorporation of activator elements into the basic matrix compound. Such solid state reactions are hampered by transport and mobility limitations of the solid state. Precipitation techniques have been used in the preparation of high quality, raw mix constituents such as dibasic calcium phosphate. The firing of raw mix constituents requires costly furnace equipment as well as requiring considerable time for firing, cooling, and grinding the material to a finely divided status.

The use of urea in the production of dibasic calcium phosphate is taught by Aia, U.S. Pat. 3,065,053, dated Nov. 20, 1962. This phosphate is then used as one of the raw mix constituents for production of calcium halophosphate phosphor. The halophosphates continue to be the most important commercial phosphor in the fluorescent lamp industry.

It is an object of this invention to provide a method for producing activated calcium phosphate-halide phosphors by precipitation from solution.

The foregoing and other objects that will become apparent as the description proceeds are accomplished by precipitating activated calcium phosphate-halide phosphor from solution. As one embodiment, the requisite phosphor constituents are incorporated into different solutions, with the calcium in one solution and the phosphate in a second solution, and with the phosphate being in excess over that amount which will combine with calcium as a precipitate. When the solutions are mixed, the phosphor precipitates. More specifically, an ammoniacal calcium chloride solution is slowly added to an acidic solution comprised of the requisite amounts of phosphate radical containing compound, and activator containing compounds. When the pH of the resulting mixture rises, as the ammonia and calcium compound are added, the calcium phosphate-halide is precipitated.

In another technique an acidic solution containing the requisite constituents: calcium compound, phosphate-radical-containing compound, fluorine compound, and activator-containing compounds is mixed with an aqueous solution of urea, which uniformly decomposes in water to produce ammonium hydroxide as the reactive constituent. The ammonium hydroxide produced slowly raises the pH of the solution and the phosphor is precipitated.

DESCRIPTION OF THE PREFERRED EMBODIMENTS

Example I

Two solutions are prepared. Solution A is prepared by mixing 0.492 mole of $CaCl_2 \cdot 2H_2O$ and 0.95 mole of $NH_4OH$, and distilled water is added to bring the total volume to 600 ml. Solution B is prepared by dissolving 0.00445 mole of $Sb_2O_3$ in a solution of 0.105 mole $NH_4F$ and 9 ml. HCl concentrated reagent. To this is added 0.008 mole of $MnCl_2 \cdot 4H_2O$ and 0.318 mole of $H_3PO_4$ solution, and distilled water is added to bring the total volume to 600 ml. Solution B is mechanically stirred and heated to about 100° C.; solution A is added over a period of about six hours and the mixture is maintained at 100° C. A crystalline precipitate is formed. After separation from the supernatant liquid and drying, the precipitate is luminescent when arradiated with 2537 A.U. excitation and emits visible light of a bluish-pink color. Digestion of a sample of this phosphor in an ammoniacal solution of ethylene-diamine tetraacetic acid accompanied by heating effected an improvement in the brightness.

An alternative procedure in the preparation is to mix the solutions in a large reservoir of distilled water and have the precipitate form therein.

In this embodiment, the dissolved constituents of the individual solutions are so selected that the metallic ions contained therein are precipitated when the solutions are mixed, and the presence of the phosphate radical coupled with the dissolved halide and activator in the proportions as specified causes the precipitate to exhibit the fluorescence. The dissolved fluoride is included in the same solution as the phosphate, and the chloride can be included in either or both solutions.

Example II

A solution is prepared by dissolving 0.0478 mole of $CaHPO_4$ in 8 ml. of HCl concentrated reagent, adding 0.0022 mole of $MnCl_2 \cdot 4H_2O$, and 0.000445 mole of $Sb_2O_3$ dissolved in 0.6 ml. of HCl concentrated reagent, and 0.024 mole of $NH_4F$. A 3 ml. solution containing 0.068 mole of $CO(NH_2)_2$ is added and thoroughly mixed with the first solution and brought up to a total volume of 60 ml. by diluting with distilled water. The mixture is reacted for fourteen hours, for example, while maintained at about 100° C. to speed the reaction. The activated calcium phosphate-halide phosphor is thereby precipitated. The precipitate is again separated from the supernatant liquid and dried. The heating of the mixture serves to speed the reaction by promoting decomposition of the urea. However, the urea will decompose without heating at a slower rate.

In Examples I and II the amount of $MnCl_2.4H_2O$ can be varied or this compound can be eliminated. The halogen and phosphate radical constituents will normally be supplied in excess with respect to the amounts of these radicals which will react with the controlled amount of calcium which is present to form the phosphor precipitate. The relative amounts of fluorine radical and chlorine radical can be varied with respect to one another, and the ratio of fluorine radical to chlorine radical does not appear to be critical with respect to forming the phosphor precipitate. The amount of urea supplied can be varied from 0.03 to 0.15 mole although 0.068 mole is preferred. The amount of urea used in Example II and the amount of ammonium hydroxide used in Example I desirably are supplied to give the resulting solution of a pH at least 5 and a preferred value of from 5 to 7 to precipitate the phospor.

While specific amounts of the constituents have been specified in the examples it has been found that the total solution constituents can be varied according to the following ratios: the ratio of gram-moles of phosphate radical containing compound in solution to gram-atoms of calcium in solution is at least 0.62/1, the ratio of gram-atoms of fluorine and chlorine to gram-atoms of calcium in solution is at least 0.2/1, the ratio of gram-atoms of antimony in solution to gram-atoms of calcium in solution is from 0.005/1 to 0.1/1, and the ratio of gram-atoms of manganese in solution to gram-atoms of calcium in solution is from 0 to 0.05/1.

While specific examples of preparation of the present calcium phosphate-halide phosphor have been set forth, the invention is not to be limited thereto or thereby.

I claim as my invention:

1. The method of producing a calcium phosphate-halide phosphor which is activated by antimony or antimony plus manganese, which method consists essentially of:
    (a) separately preparing predetermined amounts of an acidic solution and a basic solution respectively consisting essentially of the following constituents:
        (1) said acidic solution having a pH of less than five and containing a predetermined proportion of phosphate-radical-containing compound, and a predetermined proportion of antimony-containing compound, with or without a predetermined proportion of manganese-containing compound, and the only other metallic ions in said acidic solution consisting essentially of calcium,
        (2) said basic solution containing ammonium hydroxide or a compound which decomposes to ammonium hydroxide, and said basic solution being substantially free of metallic ions other than calcium,
        (3) predetermined amounts of calcium-containing compound together with fluoride-containing compound and chlorine-containing compound included in one or both of said acidic and basic solutions, and
        (4) the predetermined proportions of said constituents in each of said solutions being such that the total respective gram-atom ratio of phosphate radical to total caluium is at least 0.62/1, the ratio of total fluorine and chlorine to total calcium is at least 0.2/1, the ratio of antimony to calcium is from 0.005/1 to 0.1/1, and the ratio of manganese to calcium is from 0 to 0.05/1;
    (b) mixing said basic solution and said acidic solution to precipitate said phosphor; and
    (c) separating the precipitated phosphor from the supernatant liquid 2. The method as specified in claim 1, wherein said basic solution is slowly added to said acidic solution.

3. The method as specified in claim 1, wherein substantially all of said calcium-containing compound is included in said basic solution.

4. The method as specified in claim 1, wherein substantially all of said calcium-containing compound is included in said acidic solution.

5. The method as specified in claim 1, wherein said calcium-containing compound is included in both said basic and said acidic solution.

6. The method as specified in claim 2, wherein said acidic solution consists essentially of phosphoric acid, antimony oxide, manganese chloride, hydrochloric acid, and ammonium fluoride as the reactive constituents, and said basic solution consists essentially of calcium chloride and ammonium hydroxide as the reactive constituents, said constituents of said solutions being in such proportions that the total gram-atom ratio of phosphate radical to calcium is about 0.63/1, the gram-atom ratio of fluorine to calcium is about 0.214/1, the gram-atom ratio of chlorine to calcium is about 2/1, the gram-atom ratio of antimony to calcium is about 0.016/1, and the gram-atom ratio of manganese to calcium is about 0.016/1.

7. The method as specified in claim 5, wherein said basic and said acidic solutions are mixed in a reservoir of distilled water.

8. The method as specified in claim 5, wherein said precipitate is digested with an ammoniacal solution of ethylene-diamine-tetracetic acid.

9. The method as spesified in claim 5, wherein said basic solution is slowly added to said acidic solution at a rate of about 100 ml. per hour, while the resulting mixture is maintained at about 100° C.

10. The method as specified in claim 1, wherein said acidic solution consists essentially of dibasic calcium phosphate, manganese chloride, antimony oxide, ammonium fluoride and hydrochloric acid as the reactive constituents, and said basic solution consists essentially or an aqueous solution of urea as the reactive constituent, said constituents of said solutions being in such proportions that the total gram-atom ratio of phosphate radical to calcium is about 1/1, the gram-atom ratio of fluorine to calcium is about 0.5/1, the gram-atom ratio of chlorine to calcium is about 0.0/1, the gram-atom ratio of antimony to calcium is about 0.018/1, and the gram-atom ratio of manganese to calcium is about 0.046/1.

11. The method as specified in claim 10, wherein the resulting mixture of said acidic and said basic solutions is reacted for about fourteen hours at a temperature of about 100° C.

12. The method of producing by precipitation a calcium phosphate-halide phosphor which is activated by antimony or antimony plus manganese, which method comprises:
    (a) separately preparing predetermined amounts of a first acidic solution and a second basic solution respectively consisting essentially of the following constituents:
        (1) said first acidic solution containing a predetermined proportion of phosphate-radical-containing compound, a predetermined proportion of fluorine-containing compound, and a predetermined proportion of antimony-containing compound, with or without a predetermined proportion of manganese-containing compound,
        (2) said second basic solution containing a predetermined amount of calcium-containing compound,
        (3) a predetermined amount of chlorine-containing compound included in one or both of said first and second solutions, and
        (4) the dissolved constituents of said solutions being preselected to precipitate the metallic ions therefrom when said solutions are mixed, the predetermined proportions of said constituents in each of said solutions being such that the total respective gram-atom ratio of phosphate radical to total calcium is at least 0.62/1, the ratio of total fluorine and chlorine to total calcium is at least 0.2/1, the ratio of antimony to calcium if from 0.005/1 to 0.1/1, and the ratio of manganese to calcium is from 0 to 0.05/1;

(b) mixing said first solution and second solution to precipitate said phosphor; and
(c) separating the periciptated phosphor from the supernatant liquid.

References Cited

UNITED STATES PATENTS 3,047,512  7/1962  Martyny.
3,065,053  11/1962  Aia _____ 23—109
3,242,369  3/1966  King et al.

FOREIGN PATENTS 717,653  10/1954  Great Britain.

TOBIAS E. LEVOW, Primary Examiner

R. D. EDMONDS, Assistant Examiner